United States Patent [19]
Austin et al.

[11] 3,811,253

[45] May 21, 1974

[54] APPARATUS FOR THE CONCENTRATION REDUCTION OF A GAS STREAM

[75] Inventors: Robert R. Austin, Pasadena; David M. Creighton, Hacienda Heights, both of Calif.

[73] Assignee: International Telephone and Telegraph Corporation, New York, N.Y.

[22] Filed: May 26, 1970

[21] Appl. No.: 40,671

[52] U.S. Cl. ............................ 55/270, 55/73, 73/23
[51] Int. Cl. ..................... B01d 53/04, G01n 31/00
[58] Field of Search .............. 55/19, 36, 33, 73, 74, 55/208, 270, 387, 67; 73/23, 27

[56] References Cited
UNITED STATES PATENTS

| | | | |
|---|---|---|---|
| 2,449,067 | 9/1948 | Guillemin, Jr. | 73/23 |
| 3,263,488 | 8/1966 | Martin | 55/67 |
| 3,460,319 | 8/1969 | Tkach | 55/19 |
| 3,285,701 | 11/1966 | Robertson | 55/67 |
| 3,416,293 | 12/1968 | Alexander | 55/73 |
| 3,448,031 | 6/1969 | Robinson | 204/195 T |

Primary Examiner—Charles N. Hart
Attorney, Agent, or Firm—A. Donald Stolzy

[57] ABSTRACT

An apparatus for reducing the concentration of a constituent in a fluid. A portion or all of the constituent is removed from a portion of the fluid and the constituent free portion is remixed with constituent containing portion. In a flowing system, a limited range electrolytic titrator may analyze the mixed output when the input concentration varies over a very large range. The apparatus of the invention may include a three way valve to pass the input thereto either through a filter or through a bypass. The three way valve may be a solenoid valve operated by a pulse generator. A needle valve may be employed in the bypass, but need not be employed at all in many cases. If a single conduit from where the filter and bypass outputs join is not fairly large or long, preferably a mixing tank or other mixing device is provided.

10 Claims, 3 Drawing Figures

PATENTED MAY 21 1974 3,811,253

INVENTORS.
ROBERT R. AUSTIN
DAVID M. CREIGHTON
BY
ATTORNEY

APPARATUS FOR THE CONCENTRATION REDUCTION OF A GAS STREAM

BACKGROUND OF THE INVENTION

This invention relates to the art of fluid handling, and more particularly to a method of, and apparatus for, reducing the concentration of a constituent in a fluid.

The invention will have a great many applications other than those disclosed herein and therefore is not to be limited to said disclosed applications. However, the invention has been found to be particularly useful in reducing the concentration of a constituent in a fluid by an accurately known factor so that an electrolytic titrator having a limited low range can produce a D.C. current or voltage and thereby indicate the concentration of the constitutent over a very large range. The said current or voltage may thus be employed to operate a meter or recorder or process controls for constituent concentration monitoring or otherwise. That is, the output of the titrator may have any desired use or any use to which it has been put in the prior art.

In the past, it has been the practice to reduce the concentration of a constitutent in a fluid for monitoring or otherwise by an electrolytic titrator by, for example, mixing a metered quantity of air with the sample fluid. The quantity of the sample and the quantity of the air was determined by the setting of two valves, respectively.

The above-described prior art dilution method has several disadvantages. In the first place, meter inaccuracies result in an inaccurate monitoring function. Further, inaccuracies develop because of the lack of uniform sample and air pressures. Still further, particularly at small openings, the control valves become plugged with small particles.

The above-described prior art method also cannot easily be used in the field because a constant supply of air must be provided.

Overall, the above-described prior art method is not very accurate, it is not trouble free in that an auxiliary supply of air must be provided and it is not economical to practice.

SUMMARY OF THE INVENTION

In accordance with the apparatus of the present invention, the above-described and other disadvantages of the prior art are overcome by removing a known portion of the constituent to be detected.

In accordance with the present invention, no flow meter is required. The inaccuracies attendent upon the use of flow meters are thus avoided. No additional supply of any gas or liquid is necessary, and the known uniform pressure of the air and sample gas used in the prior art dilution method does not exist in the practice of the present invention.

In accordance with a special feature of the present invention, a three way valve is employed to send the same gas alternately through a filter and through a bypass conduit. The valve can thus always be fully opened regardless of its position. The three way valve thus never becomes plugged with small particles.

It is also a special feature of the invention that no chemical or fluid or other material need be supplied as air was supplied in the prior art.

The present invention produceds an accurate output in accordance with the presence of the said constituent. The method and apparatus of the present invention are also trouble free and economical to practice.

In accordance with another feature of the invention, the constituent is removed by a filter or scrubber.

In accordance with a further feature of the invention, a needle valve provides a constriction for pressure equalization; however, it has been found that no constriction whatsoever is required in a great many cases.

A further feature of the invention resides in the use and construction of a mixing tank for mixing outputs of the filter and bypass together.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
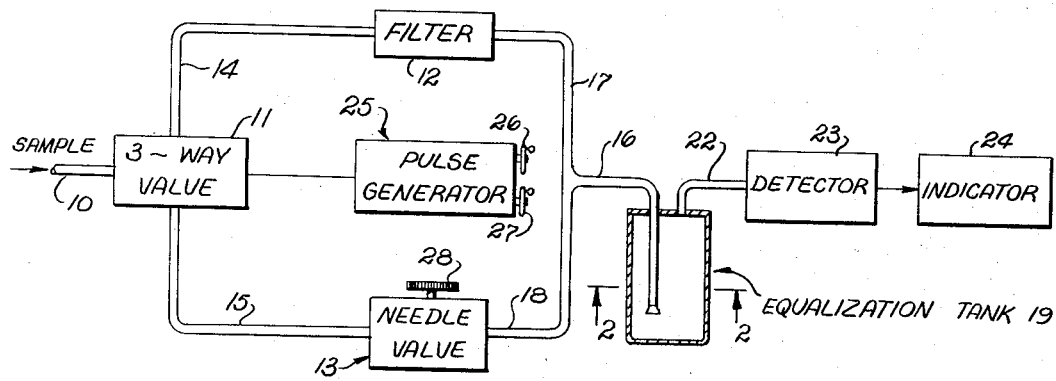
FIG. 1 is a diagramatic view of one embodiment of the present invention.

As shown in FIG. 1, a sample fluid such as a gas or a liquid is supplied to the input of a three way valve 11. One example of the method and apparatus of the invention will be described in the following. However, it is to be understood that the sample fluid may be any fluid. That is, it may be either any liquid or any gas. However, the example to be described will be described in connection with the detection of hydrogen sulfide or sulfur in a gas.

In accordance with the foregoing, many of the component parts of the invention may be drastically modified or eliminated altogether without departing from the invention. Thus, for example, a three way valve 11 will be described but need not be employed as described.

Three way valve 11 may be entirely conventional and have only two stable positions. In one stable position, it provides for free gas flow from input conduit 10 to an output conduit 14. In its other stable position, it provides for free flow from input conduit 10 to output conduit 15. Thus, when conduit 14 receives flow, conduit 15 does not receive any flow, and vice versa.

Three way valve 11 is a conventional solenoid valve and has a spring biased poppet which prevents flow from conduit 10 to conduit 15 when no electrical voltage is applied thereto. Thus, flow is normally from conduit 10 through three way valve 11 to conduit 14. When three way valve 11 receives an operating voltage, which it does from pulse generator 25, flow from input conduit 10 is entirely received by output conduit 15, and conduit 14 receives no flow from conduit 10. Pulse generator 25 operates at a constant pulse repetition frequency (PRF). Pulse generator 25 produces an output pulse at said PRF of a constant time width. Even though the PRF and the pulse width of the output of pulse generator 25 are both constant, each may be adjusted manually by handwheels 26 and 27, respectively.

Pulse generator 25 may be entirely conventional. Further, either the PRF or pulse width adjustments may be eliminated, if desired. Moreover, both of said adjustments may be eliminated, if desired. In such a case, pulse generator 25 may simply be a commutator operated at a synchronous motor.

The fluid flow through conduit 14 is passed through a filter or scrubber 12 which removes substantially all of the hydrogen sulfide or sulfur. The output of filter 12 is passed to a common conduit 16 through an output conduit 17.

The sample fluid flow in conduit 15 is passed through a needle valve 13, through a conduit 18 to the common conduit 16. The amount that needle valve 13 is closed is manually adjustable by a set screw 28. It is a substantial feature of the method and apparatus of the present invention that the adjustment 28 may be eliminated in many cases, and that the entire needle valve 13 may also be eliminated in many cases.

Figure 2:
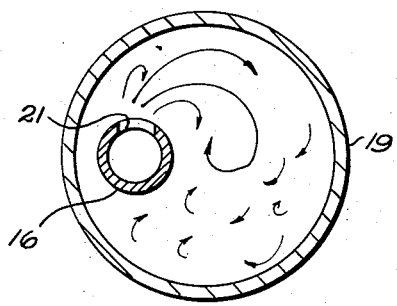
FIG. 2 is a transverse sectional view of a mixing tank taken on the line 2—2 shown in FIG. 1.

Conduit 16 extends to a mixing or equalization tank 19 and is plugged with a fluid type seal. An opening is provided through the wall of conduit 16 at 21, as shown in FIG. 2. Opening 21 may be substantially circular, if desired, and have the proportions and location shown in FIG. 2.

Tank 19 has an output conduit 22 which is sealed to the tank 19, but does not extend below the upper interior wall therein, as shown in FIG. 1. Note will be taken that the lower end of conduit 16, and the vertical location of opening 21 therein is spaced a substantial distance from the upper interior wall of tank 19 to facilitate mixing. Note further, in FIG. 2, that the location of conduit 16, the size and location of hole 21 and the location of tank 19 relative thereto produces a swirling action of the gas emanating from opening 21 to facilitate mixing. Thus, the structure, although it is quite simple, produces a desirable mixing function to prevent detector 23, shown in FIG. 1, from producing pulse outputs of a substantial magnitude.

Tank 19 is completely sealed, and the only openings therethrough through which conduits 16 and 22 extend are provided with fluid tight seals to the said conduits 16 and 22, respectively.

Detector 23 may be any means for detecting the presence of the constituent of interest.

Indicator 24 may be any type of indicator including, but not limited to, a D.C. volt meter or A.C. meter calibrated to read in constituent concentration. Alternatively, detector 23 may be a pen recorder or another type of recorder.

In accordance with the present invention, indicator 24 may be completely eliminated, if desired. For example, the output of detector 23 may be used to control devices or otherwise in a process or otherwise. For example, detector 23 may be employed in a servo controlled process.

Figure 3:
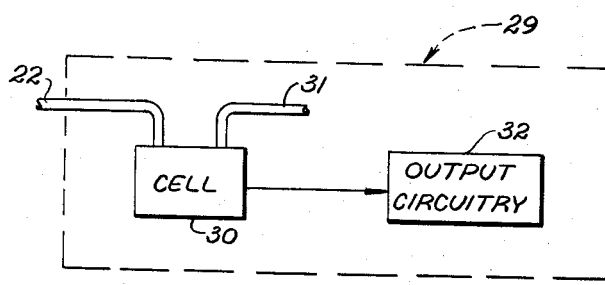
FIG. 3 is a diagramatic view of an electrolytic titrator which may be connected from the outlet of the mixing tank.

As shown in FIG. 3, detector 23 may be an electrolytic titrator 29 having an electrolytic cell 30 and output circuitry 32 connected therefrom. Cell 30 may receive gas in conduit 22 and expell the same after a bubbling process in conduit 31.

Titrator 29 may be identical to any one of the embodiments referred to in U.S. Pat. No. 3,448,031.

OPERATION

In the operation of the embodiment of the invention shown in FIG. 1, needle valve 13 may be set with set screw 28 to equalize the pressures in conduits 17 and 18, if desired. The setting of pulse generator 25 is not critical, but it has been found that when a certain ratio is smaller, calibration is easier. However, for a large ratio, the apparatus shown in FIG. 1 may be calibrated, as will be described, and the apparatus can be operated with almost any ratio.

The ratio referred to is related to the PRF and pulse width of the output signal of pulse generator 25. If the period of the pulse generator is defined as the reciprocal of the PRF, then the said ratio is the ratio of the said period to the pulse width. For example, if the period is 10 seconds, and the pulse width is 1 second, the ratio is 10. The range expansion of titrator 29 is then 10. The same is true if the period is 1 second and the pulse width is 0.1 second. A typical period is 1 second, and for the said 1 second period, typcial pulse widths are, for example, 0.1 second, 0.2 second and 0.3 second.

Thus, in the operation of the embodiment of the invention shown in FIG. 1, handwheels 26 and 27 are set to suitable figures. Three way valve 11 is then pulsed on, for example, for 0.1 second and at a PRF of 1 per second. This means that 1/10 of the time the sample flow is into conduit 15, and for 9/10 of a second flow is into conduit 14.

Filter 12 removes substantially all of the hydrogen sulfide or sulfur in the flow through conduit 14 and mixes the remaining constituents with the flow in conduits 15 and 18 in conduit 16 and tank 19.

In tank 19, the constituents of the gases in conduits 17 and 18 are mixed more thoroughly together and pass through cell 30 of titrator 29. The output circuitry 32 may be employed to provide a D.C. voltage or a D.C. current for indication, recording, process control or otherwise.

In accordance with the foregoing, it is to be noted that the embodiment of the present invention shown in FIG. 1 does not require flow meters. Inaccuracies attendent upon the use of flow meters are thus avoided.

As distinguished from the prior art method, no additional air is provided, and the maintaining of uniform gas pressure is no problem.

It is also an advantage of the invention that either conduit 14 or conduit 15 is completely open to inlet conduit 10. Valve 11 thus need not be maintained in any position which is only partially open, but may be always maintained in a completely open position. Valve 11 thus does not become plugged with small particles.

It is also an advantage of the invention that no additional air, chemical, or other material need be employed. The present invention is thus particularly suited to field use.

From the foregoing, it will be appreciated that the method and apparatus of the present invention are quite accurate, trouble free and economical to practice.

Due to the function that the system of FIG. 1 performs, it may be described as a range expander for titrator 29.

Any device for removing the desired constituent may be substituted for filter 12. However, if desired, filter 12 may be a simple conventional activated charcoal filter for removing hydrogen sulfide or sulfur.

Any device may be employed to accomplish the same function as tank 19 and the structure connected therewith. Preferably, tank 19 or some equivalent is employed. It is possible to keep tank 19 quite small. For example, it is possible with a pulse generator PRF of 1 pulse per second to keep the volume defined by the internal surfaces of tank 19 to substantially below 8 cubic inches. It is true, however, that to reduce the ripple in the output of detector 23 to a certain predetermined value, if the PRF of pulse generator 25 is lowered, the size of tank 19 must be increased. Thus, it is an advantage of the present invention that the size of tank 19 can be substantially reduced for economy's sake or for any other reason simply by increasing the PRF.

As stated previously, many of the component parts of the present invention may be changed drastically or omitted. Thus, one feature of the invention may be employed by itself or in combination with any one or more of the other features without departing from the true scope of the present invention. Further, pulse generator 25 may be electronic or electrical, pneumatic, hydraulic or mechanical.

When the width of the output pulse of pulse generator 25 becomes so small that the reaction time of the solenoid of valve 11 is sluggish or fluid flow is affected, the range expansion of titrator 29 will not necessarily be accurately equal to the ratio of the PRF to the pulse width. However, the precise range expansion can be determined by introducing a standard sample, or one or more standard samples in succession, to three way valve 11. Standard samples may be generated for calibration in accordance with a method and apparatus disclosed and referred to in U.S. Pat. No. 3,180,132. The range expansion can be determined accurately in this manner. Further, the apparatus of the present invention has high reliability and repeatability even when the said calibration by a standard sample is necessary. That is, the constituent input, I, to the titrator will always be equal to some constant factor, $K$, times the constituent content, $C$, in the input to valve 11. Thus $I = KC$, where $K = 1/R$. When the said calibration is not needed, $R$ becomes equal to the said ratio of the pulse generator period to the pulse width.

What is claimed is:

1. Apparatus for reducing the concentration of a constituent of a fluid by a known fraction thereof, said apparatus comprising: an input conduit to receive the fluid; a filter adapted to remove the constituent from the fluid; a solenoid operated three-way valve having an inlet connected from said inlet conduit, and first and second outlets; an outlet connected from said inlet conduit, and first and second outlets; an outlet conduit, said filter having an inlet and an outlet, a first conduit connected from said three-way valve first outlet to said filter inlet, a second conduit connected from said filter outlet to said outlet conduit; conduit means connected from said three-way valve second outlet to said outlet conduit; and a pulse generator connected to the solenoid, said pulse generator producing output pulses of a constant width and of a constant pulse repetition frequency, said pulses causing said three-way valve to be in a first position over the duration thereof and in a second position at all other times between said pulses, said three-way valve connecting said inlet conduit to said first conduit and to said conduit means when said three-way valve is in one and the other of said first and second positions, respectively, said constituent in said outlet conduit being a fraction of that in said inlet conduit, said fraction being equal to one of two ratios, one of said ratios being that of said pulse width to the period of said pulse generator, the other of said ratios being the reciprocal of said one ratio.

2. The invention as defined in claim 1, including mixing means connected from said outlet conduit to mix and to intermingle the contents flowing thereinto from said second conduit and said conduit means.

3. The invention as defined in claim 1, wherein said three-way valve is spring biased to said one position when said solenoid is deenegized, said fraction being said one ratio.

4. The invention as defined in claim 1, wherein said conduit means includes an adjustable needle valve having an inlet and an outlet, a third conduit connected from said second three-way valve outlet to said needle valve inlet, and a fourth conduit connected from said needle valve outlet to said outlet conduit.

5. The invention as defined in claim 1, including means to adjust said pulse width and said pulse repetition frequency.

6. Apparatus for reducing the concentration of a constituent in a fluid, said apparatus comprising: first means to remove at least a portion of the constituent from the fluid, said first means having inlet port means and outlet port means; bypass conduit means; second means to supply the fluid alternately to said inlet port means and to the interior of said bypass conduit means, said outlet port means and the interior of said bypass conduit means being in free and open communication with each other; said second means including an inlet conduit for the fluid, a three-way valve having an inlet connected from said inlet conduit, said three-way valve having first and second outlet ports, first and second conduits connected from said first and second ports, respectively, said first conduit being connected to said inlet port means, said three-way valve being a spring biased solenoid valve which prevents inlet fluid from entering said second conduit when deenergized, a pulse generator connected to energize said valve with a substantially rectangular voltage pulse of a constant pulse repetition frequency (PRF) and of a constant pulse width, third means to adjust said PRF, fourth means to adjust said pulse width, a needle valve connected from said second conduit, fifth means to adjust the opening of said needle valve, a third conduit connected from said outlet port means, a fourth conduit connected from said needle valve, an outlet conduit, the interiors of said third, fourth and outlet conduits being in free and open communication with each other, a mixing tank including a hollow cylinder and upper and lower circular end plates fixed thereto in a fluid tight manner, said upper plate having first and second holes therethrough, said first hole being located through the center of said upper plate, said second hole being spaced from said first hole, said outlet conduit extending through said second hole to a position closer to said lower plate than said upper plate, said outlet conduit having a fluid tight seal therearound to prevent fluid from passing out of said tank between it and the edge of said second hole, said outlet conduit having a hole through the wall thereof spaced from the internal surface of said upper plate, a delivery conduit sealed around said first hole to prevent fluid from passing out of said tank between it and the edge of said first hole, an electrolytic titrater having a cell and output circuitry, said cell having a gas inlet and a gas outlet, said delivery conduit being connected to said gas inlet, and a D.C. voltmeter calibrated in the concentration of hydrogen sulfide connected from said output circuitry.

7. The invention as defined in claim 6, wherein said outlet conduit opening has an angular location to direct the escape of fluid therefrom in a predetermined direction substantially perpendicular to a plane through the axis of said cylinder.

8. Apparatus for reducing the concentration of a constituent of a fluid by a known fraction thereof, said apparatus comprising: an input conduit to receive the fluid; a filter adapted to remove the constituent from the fluid; a solenoid operated three-way valve having an inlet connected from said inlet conduit, and first and second outlets; an outlet conduit, said filter having an inlet and an outlet, a first conduit connected from said three-way valve first outlet to said filter inlet, a second conduit connected from said filter outlet to said outlet conduit; conduit means connected from said three-way valve second outlet to said outlet conduit; a pulse generator connected to the solenoid, said pulse generator producing output pulses of a constant width and of a constant pulse repetition frequency, said pulses causing said three-way valve to be in a first position over the duration thereof and in a second position at all other times between said pulses, said three-way valve connecting said inlet conduit to said first conduit and to said conduit means when said three-way valve is in one and the other of said first and second positions, respectively, said constituent in said outlet conduit being a fraction of that in said inlet conduit, said fraction being equal to one of two ratios, one of said ratios being that of said pulse width to the period of said pulse generator, the other of said ratios being the reciprocal of said one ratio; mixing means connected from said outlet conduit to mix and to intermingle the contents flowing thereinto from said second conduit and said conduit means; said mixing means including an elongated fluid-tight tank having first and second ends, said outlet conduit sealed through and opening into the interior of said tank nearer said first end thereof than said second end thereof, and an exhaust conduit sealed through said tank second end.

9. The invention as defined in claim 8, wherein said conduit means includes an adjustable needle valve having an inlet and an outlet, a third conduit connected from said second three-way valve outlet to said needle valve inlet, and a fourth conduit connected from said needle valve outlet to said outlet conduit.

10. The invention as defined in claim 9, wherein said three-way valve is spring biased to said one position when said solenoid is deenergized, said fraction being said one ratio.

* * * * *